(12) United States Patent
Wang et al.

(10) Patent No.: US 7,487,686 B2
(45) Date of Patent: Feb. 10, 2009

(54) HIGH-PRECISION VORTEX FLOW METER

(75) Inventors: An-Bang Wang, Taipei (TW);
Ming-Hsun Wu, Taipei (TW); Yi-Hua Wang, Taipei (TW); I-Chun Lin, Taipei (TW); Chia-Chih Chen, Taipei (TW); Shiming Lin, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 11/790,702

(22) Filed: Apr. 27, 2007

(65) Prior Publication Data

US 2008/0141785 A1 Jun. 19, 2008

(30) Foreign Application Priority Data

Dec. 15, 2006 (TW) .............................. 95147347 A

(51) Int. Cl.
*G01F 1/32* (2006.01)
(52) U.S. Cl. ................................... 73/861.22
(58) Field of Classification Search ............... 73/861.22
See application file for complete search history.

(56) References Cited

U.S. PATENT DOCUMENTS

| 3,823,610 | A | * | 7/1974 | Fussell, Jr. ............... 73/861.24 |
| 4,228,768 | A | * | 10/1980 | Kita ........................... 123/494 |
| 4,453,416 | A | * | 6/1984 | Knudsen ................... 73/861.24 |
| 4,592,240 | A | * | 6/1986 | McHale et al. ........... 73/861.22 |
| 4,606,318 | A | * | 8/1986 | Tsuchida et al. ......... 73/861.23 |
| 4,977,781 | A | * | 12/1990 | Misumi et al. ........... 73/861.22 |
| 4,984,470 | A | * | 1/1991 | Hayward et al. ......... 73/861.22 |
| 5,123,285 | A | * | 6/1992 | Lew .......................... 73/861.22 |
| 5,170,671 | A | * | 12/1992 | Miau et al. ............... 73/861.22 |
| 5,351,559 | A | * | 10/1994 | Miau et al. ............... 73/861.24 |
| 5,808,209 | A | * | 9/1998 | Zielinska et al. ......... 73/861.22 |
| 5,880,377 | A | * | 3/1999 | Celik ....................... 73/861.22 |
| 5,913,247 | A | * | 6/1999 | Steuer ...................... 73/861.22 |
| 6,003,383 | A | * | 12/1999 | Zielinska et al. ......... 73/861.22 |
| 6,435,036 | B1 | * | 8/2002 | Sakai et al. ............... 73/861.22 |
| 6,938,496 | B2 | * | 9/2005 | Koudal et al. ............ 73/861.22 |
| 6,988,418 | B2 | * | 1/2006 | Koudal et al. ............ 73/861.22 |

* cited by examiner

*Primary Examiner*—Harshad Patel
(74) *Attorney, Agent, or Firm*—Rosenberg, Klein & Lee

(57) ABSTRACT

A high-precision vortex flow meter includes a blunt body having a predetermined dimension and being arranged inside a fluid channel to serve as a vortex shedder. The vortex flow meter also includes a temperature detecting device for detecting the vortex shedder temperature and a temperature control element for adjusting the vortex shedder temperature. A frequency measuring device is arranged in the downstream section of the blunt body for detecting the vortex shedding frequency. From the measured temperatures of the upstream fluid flow and that of the blunt body, an effective temperature and a temperature ratio are calculated. The kinematic viscosity of the fluid is looked up from database. By using the relationship between the Strouhal number and Reynolds number, the fluid flow rate is calculated. By employing different blunt body temperature, the measurement range of the flow meter can be broadly extended.

15 Claims, 5 Drawing Sheets

HIGH-PRECISION VORTEX FLOW METER

FIELD OF THE INVENTION

The present invention relates to the field of flow metering, and in particular to high-precision flow metering with adjustable measurement range.

BACKGROUND OF THE INVENTION

A conventional vortex flow meter generally comprises a fluid channel, a vortex shedder, and a vortex shedding frequency measuring device. The vortex shedder generally comprises a blunt body, such as a disk, a ring, and a T-shape. The measurement of shedding frequency is achieved by detecting the frequency of pressure fluctuation caused by periodic shedding of vortex induced downstream of the vortex shedder. The frequency measuring device is classified as invasive and non-invasive (wall-surface type). The wall-surface type frequency measuring device is becoming more popular and gradually replacing the invasive-type frequency measuring device due to the reduced pressure drop and less interference with the flow field while enhancing convenience for maintenance of the measuring device.

In the method that the conventional vortex flow meter employs to determine the flow velocity, the flow velocity is determined from a specific relationship between Strouhal number (St) and Reynolds number (Re). For example, Taiwan Patent No. 188378 discloses a linear relationship between the Strouhal number and Reynolds number, which is represented by the equation: $St=0.15814+6.73\times10^{-7}\times Re$. However, such linear relationship only exists for the specific vortex shedder in turbulent flow with high flow rates. Thus, many researches have been devoted to design vortex shedders of different shapes and structures to improve the precision and measurement ranges of vortex type flow meters.

Some studies made on vortex induced by blunt body showed that with the increase of Reynolds number, two-dimensional vortex flow gradually undergoes a transition to a three-dimensional pattern. This causes discontinuities in the relationship curve between the dimensionless frequency and Reynolds number and is often referred to as three-dimensional vortex flow transition zone. The irregularities in the vortex shedding frequencies measured in the three-dimensional regime causes troubles and errors in measurement carried out with a vortex flow meter. Consequently, the Reynolds number threshold ($Re_T$) of the transition zone of three-dimensional vortex flow is considered as the upper limit for the design of low flow rate vortex flow meter while the Reynolds number threshold ($Re_C$) for the two-dimensional vortex flow is the lower limit.

Some prior references provide different designs for a vortex flow meter. For example, U.S. Pat. No. 4,453,416 discloses a blunt body having a truncated conic shape positioned in a fluid channel of a vortex flow meter. Another example is U.S. Pat. No. 6,435,036, which discloses a triangular blunt body positioned in a fluid channel of a vortex flow meter. The design features expanded measurement range, simple construction and high precision. U.S. Pat. Nos. 4,592,240, 5,170,671, and 5,351,559 all disclose a disk-shaped blunt body positioned in a fluid channel of a vortex flow meter. Further, U.S. Pat. No. 4,977,781 discloses a sharp conic blunt body positioned in a fluid channel of a vortex flow meter, which features increased measurement range, simple construction and high precision. All these prior art references are improvement of the shape and structure of the sharp-front-edged blunt body and attempt to provide enhanced fluid measurement result.

However, the design of the conventional vortex flow meters often takes no consideration of non-isothermal applications of fluid and vortex shedder and in addition, the conventional vortex flow meters are only applicable to a fixed measurement range.

Therefore, it is desired to provide a vortex flow meter that is applicable to a wide range of flow rate and overcomes the above-discussed disadvantages of the prior arts.

SUMMARY OF THE INVENTION

Thus, the primary objective of the present invention is to provide a vortex flow meter that is applicable to flow field with low Reynolds number and to isothermal and non-isothermal flows. The vortex flow meter comprises a blunt body, a temperature detection device and a frequency measuring device. From the universal relationship between the Strouhal number and the effective Reynolds number, the flow rate of the fluid is calculated.

Another objective of the present invention is to provide a high-precision vortex flow meter with adjustable measurement range. The vortex flow meter comprises a temperature control element for adjusting the temperature of the vortex shedder and temperature sensors for detecting the temperatures of the upstream fluid field and that of the blunt body. By employing different vortex shedder temperatures, the measurement range of the vortex flow meter can be broadly extended.

A further objective of the present invention is to provide a high-precision vortex flow meter using a round-front blunt body as the vortex shedder. It enables the vortex flow meter to measure fluid flow rate in the laminar flow regime.

To achieve the above objectives, the present invention provides a high-precision vortex flow meter which comprises a blunt body having a predetermined dimension and being arranged in a fluid channel as the vortex shedder. The vortex flow meter also comprises a temperature detecting device for detecting the vortex shedder temperature and a temperature control element for adjusting the vortex shedder temperature. A frequency measuring device is arranged at a downstream section of the blunt body for detecting the vortex shedding frequency. From the measured temperatures of the upstream fluid field and that of the blunt body, an effective temperature and a temperature ratio are calculated. The kinematic viscosity of the fluid can be looked up from many resources, e.g. Chemistry dictionary, database and so on or be measured from a viscometer directly. By using the relationship between the Strouhal number and Reynolds number, the fluid flow rate is calculated.

By adjusting the vortex shedder temperature through the temperature control element, the temperature ratio is changed. Hence the measurement range of the vortex flow meter is adjusted.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
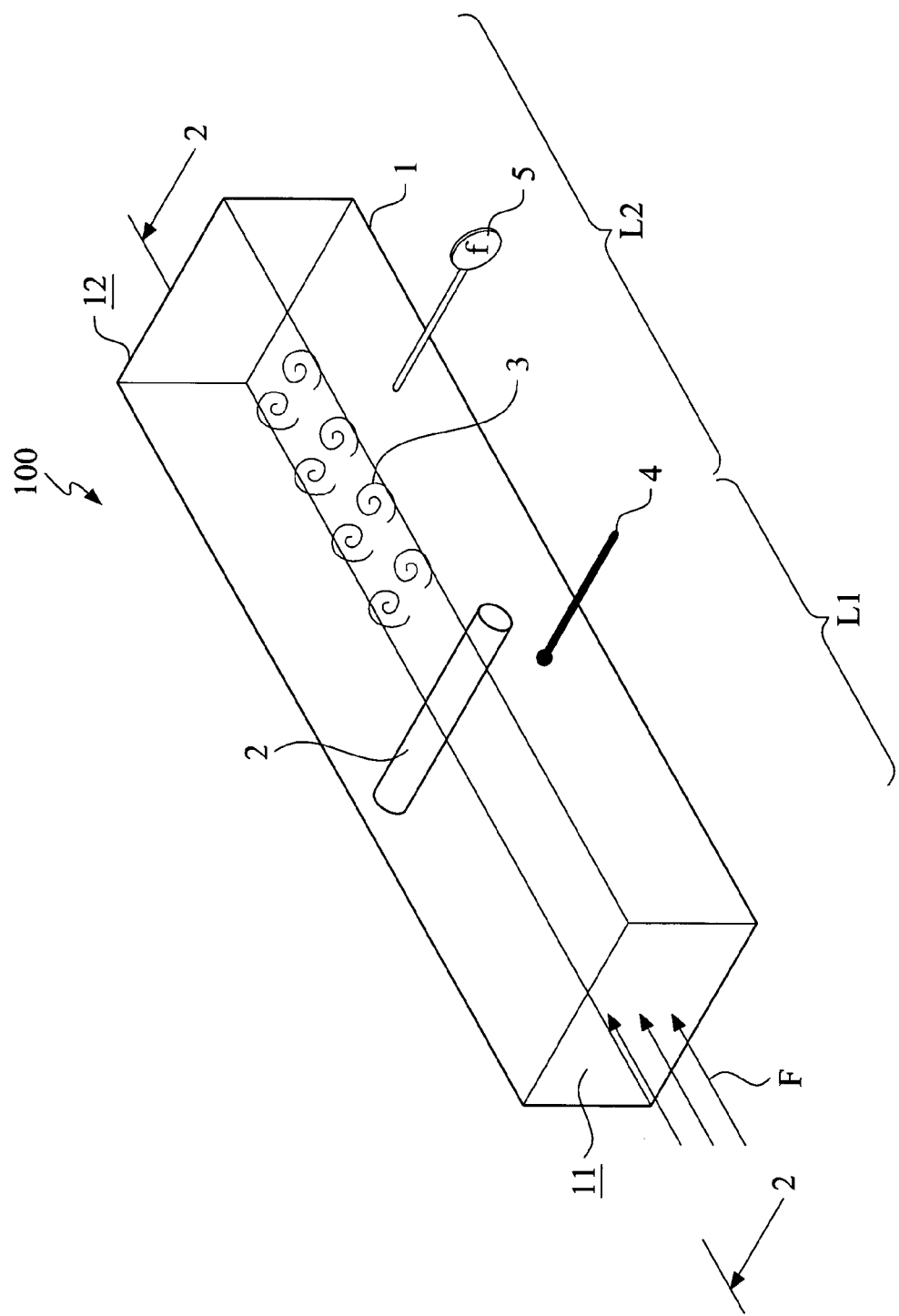
FIG. 1 schematically shows a flow meter constructed in accordance with a first embodiment of the present invention.

For a flow meter, it is known that Strouhal number (St) can be calculated from the following equation (1):

$$St = \frac{fd}{U}, \quad (1)$$

while Reynolds number (Re) can be calculated from equation (2), $$Re = \frac{Ud}{v} \quad (2)$$

in which f is the fluid shedding frequency of the flow meter, d is the characteristic diameter of the vortex shedder, U is the fluid velocity and v is the kinematic viscosity of the fluid.

It is found that the raise in temperature will increase the Reynolds number thresholds for the two-dimensional vortex flow and the three-dimensional vortex flow.

The Roshko number is equal to the multiplication of Strouhal number (St) and Reynolds number (Re), and can be expressed as:

$$Ro = St \times Re \quad (3)$$
$$= \frac{fd}{U} \times \frac{Ud}{v}$$
$$= \frac{fd^2}{v}$$

From the publication of Wang et al. in Physics of Fluids 12 (6): 1401-1410, in June 2000, the relationship between Strouhal number and Reynolds number is:

$$St = 0.2660 - 1.1060 \frac{1}{\sqrt{Re}} \quad (4)$$

Hence, Roshko number can be expressed as:

$$Ro = \left(0.2660 - 1.1060 \frac{1}{\sqrt{Re}}\right) \times Re \quad (5)$$

It is derived from the above equations that:

$$Ro = \frac{fd^2}{v} = 0.2660\,Re - 1.1060\sqrt{Re} \quad (6)$$

It is noted that Reynolds number (Re) can be calculated from substituting the fluid shedding frequency (f), the characteristic diameter of the vortex shedder (d) and the kinematic viscosity of the fluid (v) into the equation (6). From equation (2), with the Reynolds number (Re), the characteristic diameter of the vortex shedder (d) and the kinematic viscosity of the fluid (v), the fluid velocity (U), thus fluid flow rate (i.e. the multiplication of the flow velocity and channel cross-section area) can be calculated.

The kinematic viscosity for each particular fluid (v) depends on the fluid temperature (T) and can be looked up from many resources, e.g. Chemistry dictionary, database and so on or be measured from a viscometer directly.

The present invention provides a high-precision vortex flow meter that can be applied to non-isothermal applications of the vortex shedder and fluid flow field. Hence, the applicable measurement range of the flow meter is broader than that of the conventional isothermal flow meter.

When applying the equations to non-isothermal condition, the temperature of the flow upstream of the vortex shedder ($T_\infty$) and that of the vortex shedder ($T_w$) are measured. An effective temperature ($T_{eff}$) is calculated from $T_\infty$ and $T_w$, $$T_{eff} = T_\infty + C(T_w - T_\infty), \quad (7)$$

where C is a constant. For circular cylinder blunt body, C is around 0.28.

A kinematic viscosity ($v_{eff}$) is obtained from a Chemistry dictionary or database using the effective temperature. Then, a temperature ratio (T*) is defined as the vortex shedder temperature divided by that of the upstream flow:

$$T^* = \frac{T_w}{T_\infty} \quad (8)$$

For non-isothermal flow, from the experimental evidence of Wang et al. (2000), equations (6) and (2) can be re-written as:

$$Ro = \frac{fd^2}{v_{eff}} = St \times Re = 0.2660\,Re_{eff} - 1.1060\sqrt{Re_{eff}} \quad (9)$$

$$Re_{eff} = \frac{Ud}{v_{eff}}, \quad (10)$$

where $Re_{eff}$ is the effective Reynolds number of the flowing fluid and $$Re_{eff,C} \leq Re_{eff} \leq Re_{eff,T},$$

in which $Re_{eff,C}$ is the critical effective Reynolds number of the flowing fluid at the onset of two-dimensional vortex flow and $Re_{eff,T}$ is the critical effective Reynolds number of the flowing fluid at the onset of three-dimensional vortex flow.

By employing the relationship between Strouhal number and effective Reynolds number, as well as effective temperature, the vortex flow meter can be extended to non-isothermal applications.

Figure 2:
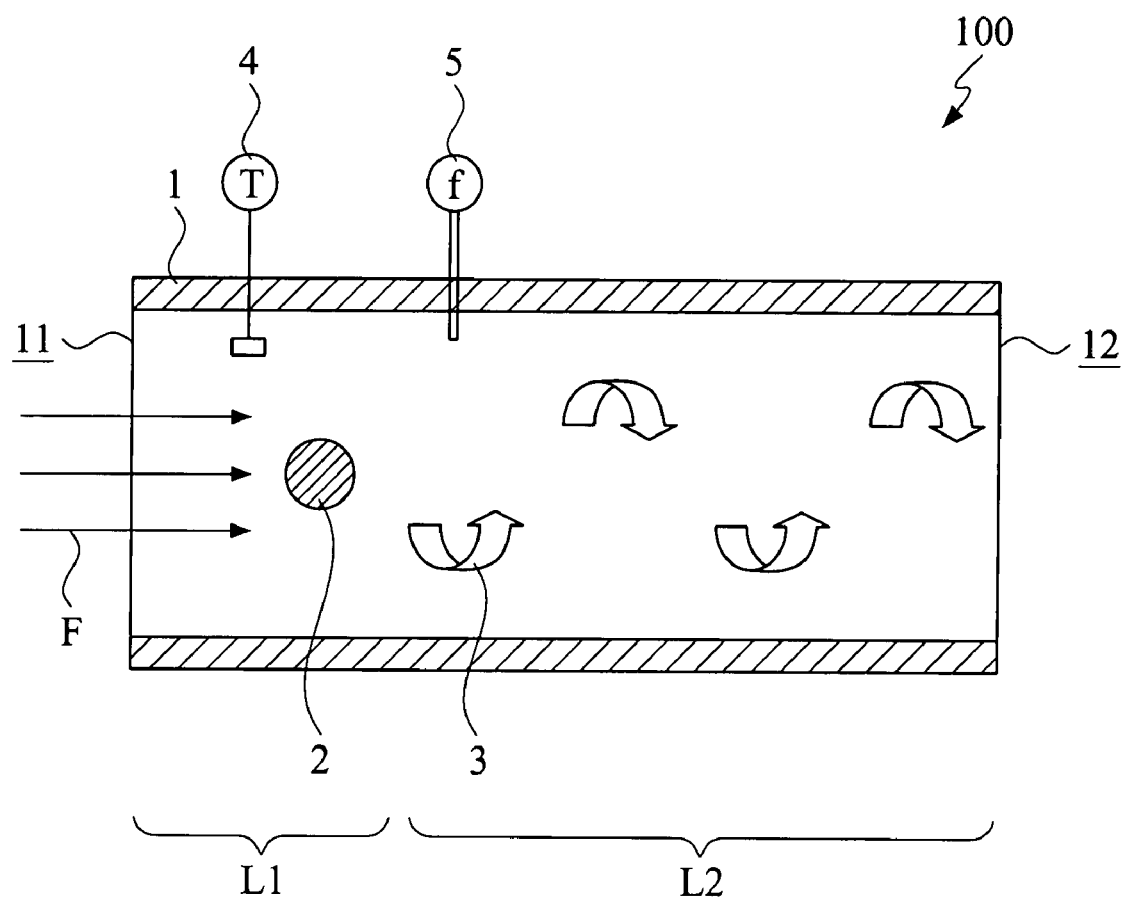
FIG. 2 shows a cross-sectional view taken along line 2-2 of FIG. 1.

With reference to the drawings and in particular to FIGS. 1 and 2, which show, respectively and schematically, a perspective view of a vortex flow meter constructed in accordance with a first embodiment of the present invention, and a cross-sectional view taken along line 2-2 of FIG. 1, the vortex flow meter of the present invention, generally designated with reference numeral 100, comprises a fluid channel 1 having a fluid inlet 11 and a fluid outlet 12 whereby a fluid F flows through the inlet 11 into the fluid channel 1.

A vortex shedder 2 is arranged inside the fluid channel 1. In a preferred embodiment of the present invention, the vortex shedder 2 comprises a blunt body, which may be a cylinder or any other equivalent geometric two-dimensional object and has a predetermined diameter d. Based on the location of the vortex shedder 2 inside the fluid channel 1, the fluid channel 1 is divided into an upstream section L1, which is the portion of the fluid channel 1 that is located between the inlet 11 and the vortex shedder 2, and a downstream section L2, wherein is the portion of the fluid channel 1 that is located between the outlet 12 and the vortex shedder 2. When Reynolds number exceeds the threshold ($Re_C$) for the two-dimensional vortex flow, the fluid F that flows through the fluid channel 1 and passes the vortex shedder 2 periodically induces vortices 3 within the downstream section L2 of the fluid channel 1.

A temperature detection device 4 is positioned in the upstream section L1 of the fluid channel 1 to detect the flow temperature ($T_\infty$) of the upstream section L1 of the fluid channel 1.

In a selected location inside the fluid channel 1, a frequency measuring device 5 is arranged. The frequency measuring device 5 detects the vortex shedding frequency (f) of the fluid 1. In an embodiment of the present invention, the frequency measuring device 5 comprises a pressure transducer and a pressure signal frequency analyzing device.

From the flow field temperature ($T_\infty$), the kinematic viscosity v of the fluid can be looked up from many resources, e.g. Chemistry dictionary, database and so on. By substituting the characteristic diameter d of the vortex shedder, the vortex shedding frequency f and the kinematic viscosity v of the fluid into equation (6), the Reynolds number (Re) can be calculated.

Then the values of Reynolds number Re, the characteristic diameter d of the vortex shedder and the kinematic viscosity v of the fluid is substituted into equation (2). Hence, the fluid flow rate is calculated.

Figure 3:
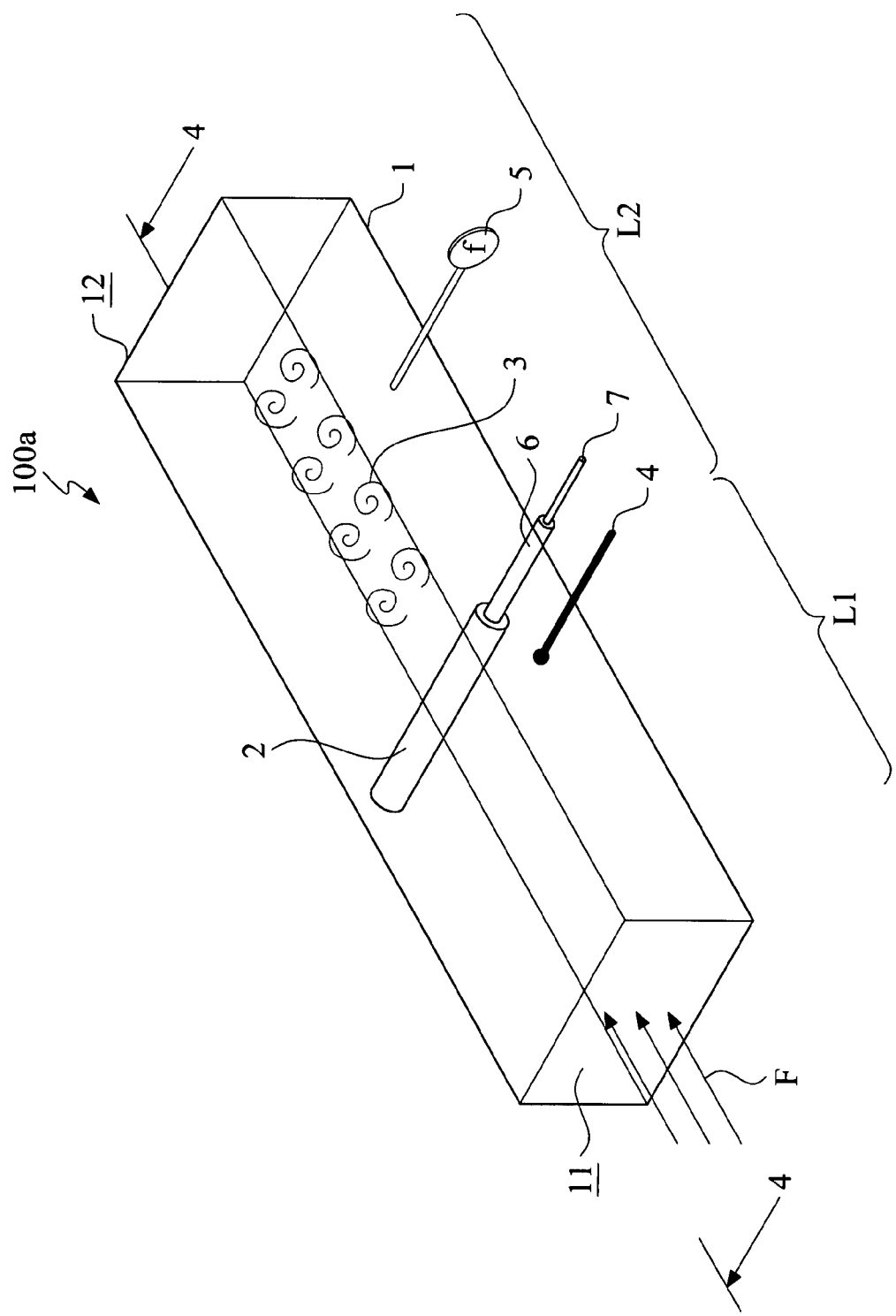
FIG. 3 schematically shows a flow meter constructed in accordance with a second embodiment of the present invention.
Figure 4:
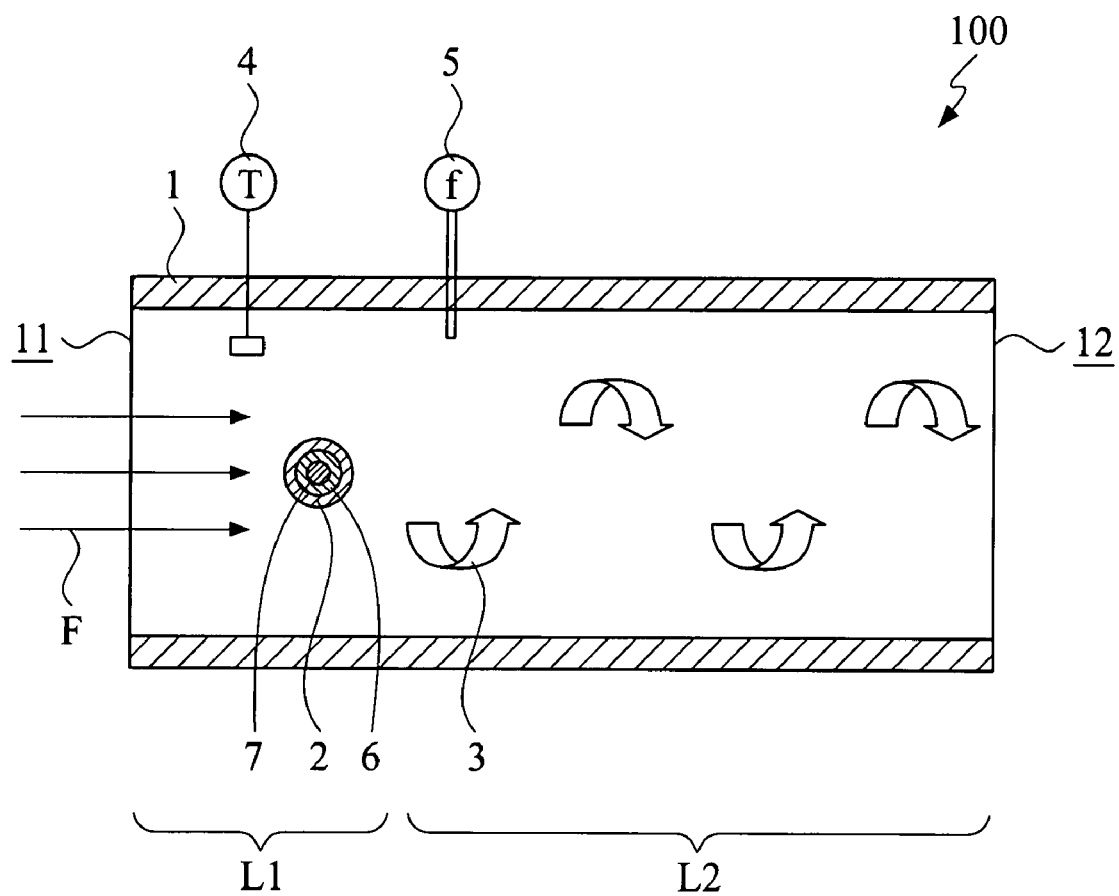
FIG. 4 shows a cross-sectional view taken along line 4-4 of FIG. 3.

FIGS. 3 and 4 respectively and schematically show a perspective view of a vortex flow meter constructed in accordance with a second embodiment of the present invention, and a cross-sectional view taken along line 4-4 of FIG. 3. The vortex flow meter of the second embodiment of the present invention, generally designated with reference numeral 100a for distinction, is substantially identical to the vortex flow meter 100 of the first embodiment illustrated in FIGS. 1 and 2, whereby identical parts/components/members bear similar reference numerals for simplicity the description herein.

The vortex flow meter 100a comprises a fluid channel 1 inside which a vortex shedder 2 is mounted. Similarly, the portion of the fluid channel 1 between a fluid inlet 11 of the fluid channel 1 and the vortex shedder 2 is defined as an upstream section L1 and that between a fluid outlet 12 of the fluid channel 1 and the vortex shedder 2 is the downstream section L2. When Reynolds number exceeds the threshold ($Re_C$) for the two-dimensional vortex flow, the fluid F that flows through the fluid channel 1 and passes the vortex shedder 2 periodically induces vortices 3 within the downstream section L2 of the fluid channel 1.

At selected positions inside the fluid channel 1, a temperature detection device 4 and a frequency measuring device 5 are arranged. The temperature detection device 4 detects the flow field temperature ($T_\infty$) of the upstream section L1 of the fluid channel 1. The frequency measuring device 5 detects the vortex shedding frequency (f) of the fluid 1.

A temperature control element 6 is connected to or located in the vortex shedder 2 to adjust the temperature ($T_w$) of the vortex shedder 2, including raising and lowering temperature ($T_w$) of the vortex shedder 2. A temperature detecting device 7 is arranged at the vortex shedder 2 for determining the temperature of the vortex shedder 2.

Based on the fluid field temperature ($T_\infty$) and the temperature ($T_w$) of the vortex shedder 2 detected, a temperature ratio ($T^*$) between the flow field of the upstream section L1 and the vortex shedder 2 can be adjusted.

From the flow field temperature ($T_\infty$) and the vortex shedder temperature ($T_w$), by applying equation (7), the effective temperature ($T_{eff}$) is calculated. The kinematic viscosity at the effective temperature ($v_{eff}$) is checked from chemistry database. The temperature ratio ($T^*$) between the temperature of the flow field of the upstream section and that of the vortex shedder is estimated. It is clear that the temperature ratio ($T^*$) may be varied by regulating the temperature control element 6 to lower or increase the vortex shedder temperature ($T_w$).

By substituting the characteristic diameter d of the vortex shedder, the vortex shedding frequency f and the kinematic viscosity $v_{eff}$ of the fluid into equation (9), the effective Reynolds number ($Re_{eff}$) is calculated.

Then the values of effective Reynolds number $Re_{eff}$, the characteristic diameter d of the vortex shedder and the kinematic viscosity v of the fluid are substituted into equation (10). Hence, the fluid flow velocity U is calculated.

Figure 5:
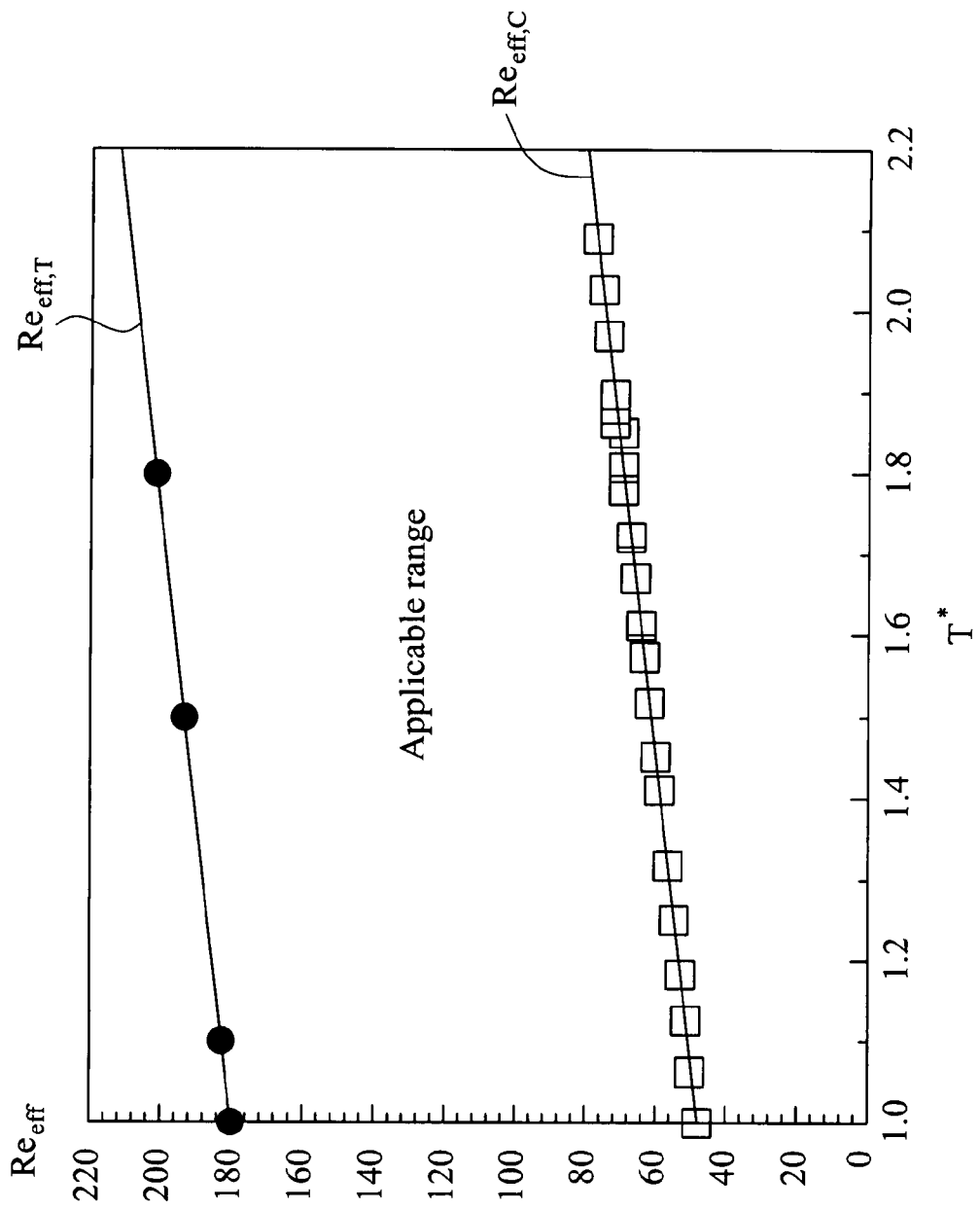
FIG. 5 shows a plot of an applicable range of the flow meter of the present invention.

FIG. 5 shows a relationship between the effective Reynolds number and the temperature ratio ($T^*$) for a vortex flow meter of FIG. 3, in which with a cylinder serving as the blunt body. $Re_{eff,C}$ is the critical effective Reynolds number at the onset of two-dimensional vortex flow and $Re_{eff,T}$ is the critical effective Reynolds number of the flowing fluid at the onset of three-dimensional vortex flow. When the effective Reynolds number exceeds the lower threshold ($Re_{eff,C}$), the fluid, when passing through the blunt body, periodically generates vortices 3 in the downstream with a vortex shedding frequency (f).

It is seen from the figure that the $Re_{eff,C}$ and $Re_{eff,T}$ increase linearly as the temperature ratio ($T^*$) increases. In other words, higher temperature ratio ($T^*$) extends the upper boundary of applicable region ($Re_{eff,T}$). Similarly, lower temperature ratio ($T^*$) extends the lower boundary of applicable region ($Re_{eff,C}$).

In other words, the measurement range of the vortex flow meter is extended to apply either for low flow rate or for high flow rate by varying the flow field temperature upstream of the vortex shedder ($T_\infty$) or/and the vortex shedder temperature ($T_w$).

To summarize, the high-precision vortex flow meter with adjustable measurement range has the following advantages:

The high-precision vortex flow meter with adjustable measurement range creatively uses the relationship of Strouhal number and Reynolds number, making it suitable for laminar flow and making it suitable for applications of low Reynolds number.

The present invention makes use of the adjustability of the temperature ratio $T^*$ between the temperature of the blunt body and that of the upstream flow field, as well as the relationship between Strouhal number and effective Reynolds number to extend the applicable measurement range between the two-dimensional vortex flow and the three-dimensional vortex flow. It makes the working range of the present invention more flexible.

Compared to the prior devices, the vortex flow meter, due to the advantages of having no moving parts, being applicable to a wide range of fluids, and low costs, has wide industrial applications. For example, the biochemical and drug industry often needs a reliable high-precision flow rate measuring device for applications of quantitative and low flow rate and, based on the curve between Strouhal number and Reynolds number at two-dimensional vortex flow, the present invention provides a high-precision flow meter with adjustable measurement range. The vortex flow meter in accordance with the present invention is further applicable to laminar flow with low Reynolds number, no longer being limited to turbulent flows, which effectively fixes the drawbacks of the conventional devices.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vortex flow meter having adaptive measurement range comprising:
   a fluid channel having an inlet and an outlet;
   a vortex shedder having a predetermined dimension, which is positioned in the fluid channel and dividing the fluid channel into an upstream section and a downstream section, a fluid entering the fluid channel through inlet and passing through the vortex shedder to generate periodic vortices in the downstream section;
   at least one upstream flow field temperature detection device positioned at a selected location in the upstream section of the vortex shedder to detect a fluid temperature ($T_\infty$) in the upstream section of the fluid channel for generation of an effective temperature parameter based thereon with respect to a temperature of the vortex shedder; and
   a frequency measuring device positioned in a selected location in the downstream section of the vortex shedder to measure the vortex shedding frequency;
   wherein the kinematic viscosity of the fluid at the fluid temperature is looked up from database, and from a relationship between Strouhal number (St) and Reynolds number (Re), the Reynolds number used for the calculation of the flow rate of the fluid is found responsive to the effective temperature parameter.

2. The vortex flow meter as claimed in claim 1, wherein the vortex flow meter further comprises a temperature control element for adjusting the temperature of the vortex shedder.

3. The vortex flow meter as claimed in claim 1, wherein the vortex shedder comprises a blunt body.

4. The vortex flow meter as claimed in claim 3, wherein the blunt body comprises a cylinder.

5. A vortex flow meter having adaptive measurement range comprising:
   a fluid channel having an inlet and an outlet;
   a vortex shedder having a predetermined dimension, which is positioned in the fluid channel and dividing the fluid channel into an upstream section and a downstream section, a fluid entering the fluid channel through inlet and passing through the vortex shedder to generate periodic vortices in the downstream section;
   at least one upstream flow field temperature detection device positioned at a selected location in the upstream section of the vortex shedder to detect a fluid temperature ($T_\infty$) in the upstream section of the fluid channel;
   at least one vortex shedder temperature detection device positioned at a selected location of the vortex shedder to detect a temperature ($T_w$) of the vortex shedder for generation of an effective temperature parameter ($T_{eff}$) based thereon with respect to the fluid temperature ($T_\infty$) upstream of the vortex shedder; and
   a frequency measuring device positioned in a selected location in the downstream section of the vortex shedder to measure the vortex shedding frequency;
   wherein the kinematic viscosity of the fluid at the effective temperature is looked up from database, and from a relationship between Strouhal number (St) and Reynolds number (Re), the effective Reynolds number used for the calculation of the flow rate is found responsive to the effective temperature parameter ($T_{eff}$).

6. The vortex flow meter as claimed in claim 5, wherein the vortex flow meter further comprises a temperature control element for adjusting the temperature of the vortex shedder.

7. The vortex flow meter as claimed in claim 5, wherein the effective temperature ($T_{eff}$) is equal to $T_\infty + C(T_w - T_\infty)$, where C is a constant.

8. The vortex flow meter as claimed in claim 7, wherein the value of C is around 0.28 for a circular cylinder blunt body.

9. The vortex flow meter as claimed in claim 5, wherein the vortex shedder comprises a blunt body.

10. The vortex flow meter as claimed in claim 9, wherein the blunt body comprises a cylinder.

11. A vortex flow meter having adaptive measurement range comprising:
    a fluid channel having an inlet and an outlet;
    a vortex shedder having a predetermined dimension, which is positioned in the fluid channel and dividing the fluid channel into an upstream section and a downstream section, a fluid entering the fluid channel through inlet and passing through the vortex shedder to generate periodic vortices in the downstream section;
    at least one vortex shedder temperature detection device positioned at a selected location of the vortex shedder to detect a temperature of the vortex shedder ($T_w$) for generation of an effective temperature parameter based thereon with respect to a temperature of the fluid upstream of the vortex shedder;
    a frequency measuring device positioned in a selected location in the downstream section of the vortex shedder to measure the vortex shedding frequency; and
    wherein the kinematic viscosity of the fluid at the fluid temperature is looked up from database, and from a relationship between Strouhal number (St) and Reynolds number (Re), an effective Reynolds number used for calculation of the flow rate is found responsive to the effective temperature parameter.

12. The vortex flow meter as claimed in claim 11, wherein the vortex flow meter further comprises a temperature control element for adjusting the temperature of the vortex shedder.

13. The vortex flow meter as claimed in claim 11, wherein the vortex shedder is a blunt body.

14. The vortex flow meter as claimed in claim 13, wherein the blunt body comprises a cylinder.

15. The vortex flow meter as claimed in claim 11 further comprising at least one upstream flow field temperature detection device positioned at a selected location in the upstream section of the vortex shedder to detect fluid temperature in the upstream section of the fluid channel.

* * * * *